United States Patent [19]

Streck

[11] Patent Number: 4,849,815
[45] Date of Patent: Jul. 18, 1989

[54] PORTABLE ELECTRONIC OFFICE AND COMPONENTS SUITABLE THEREFOR

[75] Inventor: Donald A. Streck, Ojai, Calif.

[73] Assignee: Jerry R. Iggulden, Santa Clarita, Calif. ; a part interest

[21] Appl. No.: 173,882

[22] Filed: Mar. 2, 1988

[51] Int. Cl.⁴ ............................................. H04N 1/00
[52] U.S. Cl. ..................................... 379/100; 358/471
[58] Field of Search ...................... 358/256, 293, 294; 280/878; 179/100

[56] References Cited

U.S. PATENT DOCUMENTS 4,728,803 3/1988 Catchpole ........................... 358/293

OTHER PUBLICATIONS

Licalzi, Pamela, "Fax Makers Target Low-End Market", High Technology Business, Mar. 1988.

Primary Examiner—Edward L. Coles, Sr.
Attorney, Agent, or Firm—Donald A. Streck

[57] ABSTRACT

This invention is a family of simple, inexpensive, and portable electronic devices for business support built around a simple 2-dimensional digitizing device. It includes a transmit-only facsimile transmission device/system, a simple computer-based facsimile system, and a dual-mode (digital or OCR) page reading device. The digitizing device includes a read bar having a linear read head for developing a signal reflecting a one dimensional line of viewing; apparatus for creating relative movement between sheets of material to be digitized and the read bar; and, a detector for developing a signal indicating movement of the sheets one scanned line distance. The simple transmit-only facsimile transmission system comprises the foregoing digitizing device and, a digital computer including a numeric input keyboard; a modem for connecting to a telephone line; buffer memory for receiving the entire digitized contents of a 2-dimensional viewing area; and, a first program for inputting telephone numbers, for establishing a connection to a receiving facsimile machine, for determining group type of the receiving machine, and for transmitting the digitized contents of buffer memory to the receiving machine in the proper format for its group type. When employed in the portable office, the system can be used as a photocopier to copy documents. The digitizing device can output digitized or OCR data.

40 Claims, 9 Drawing Sheets

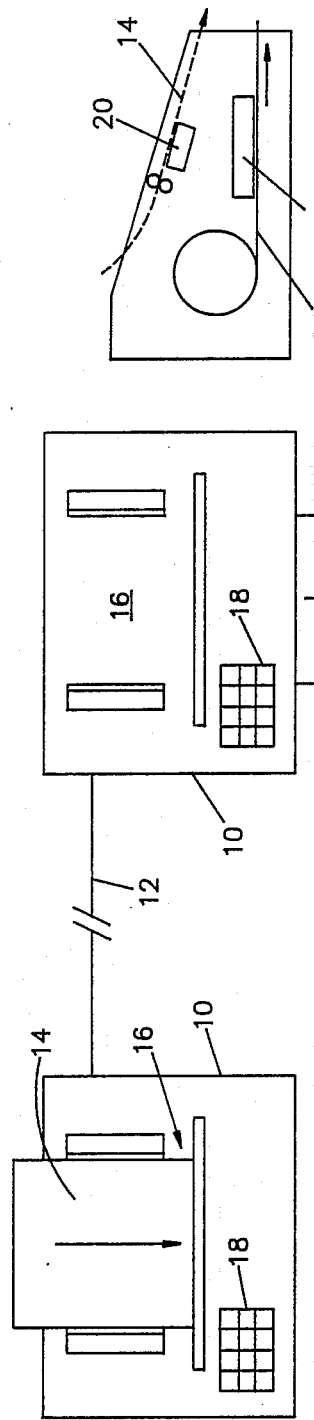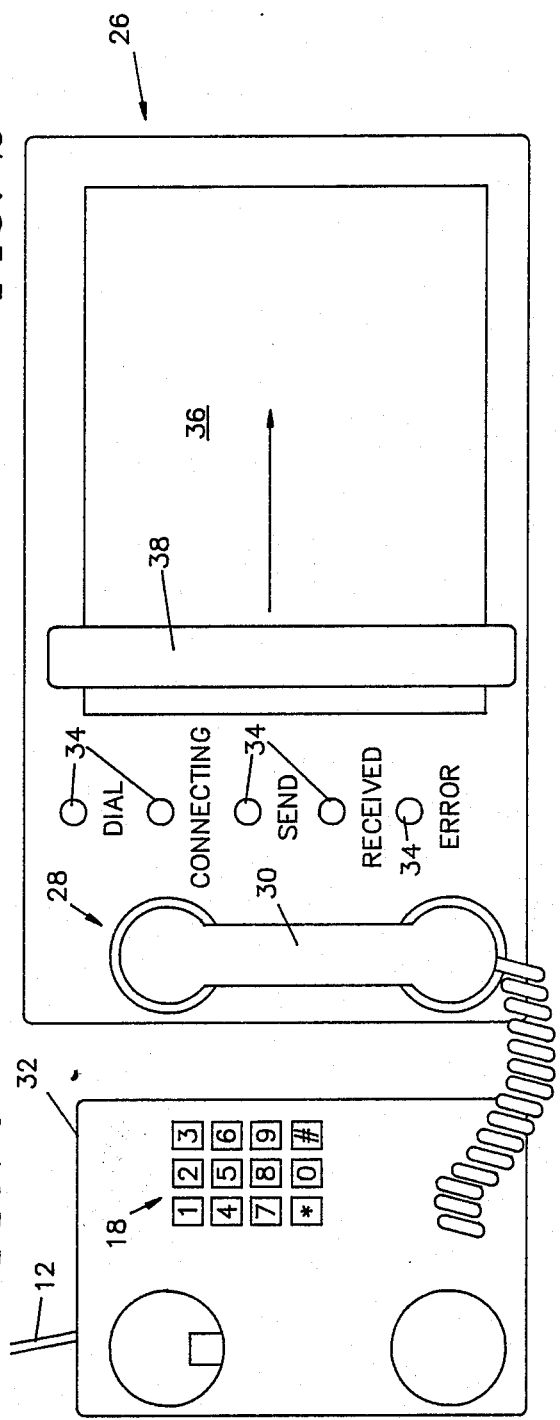

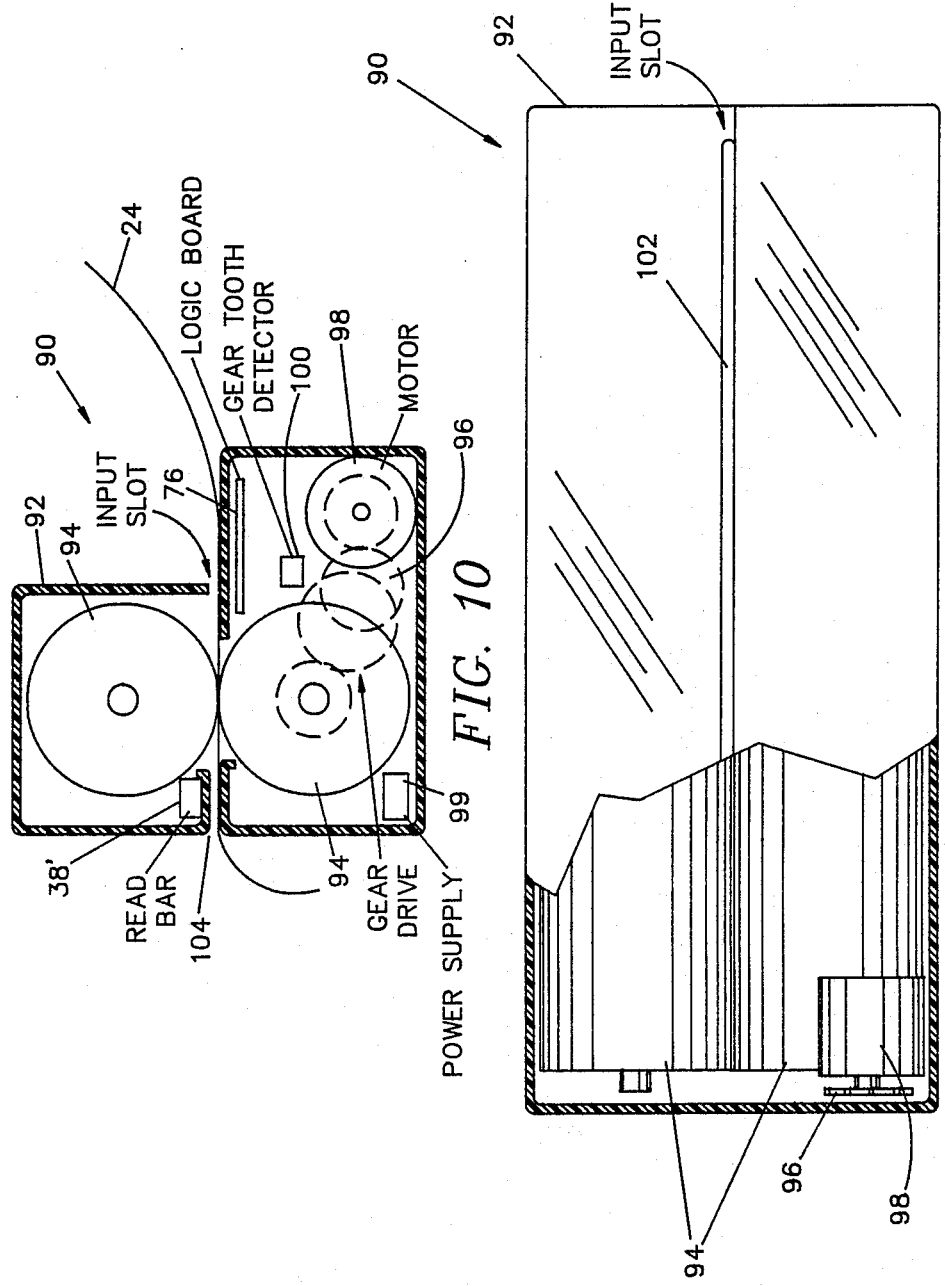

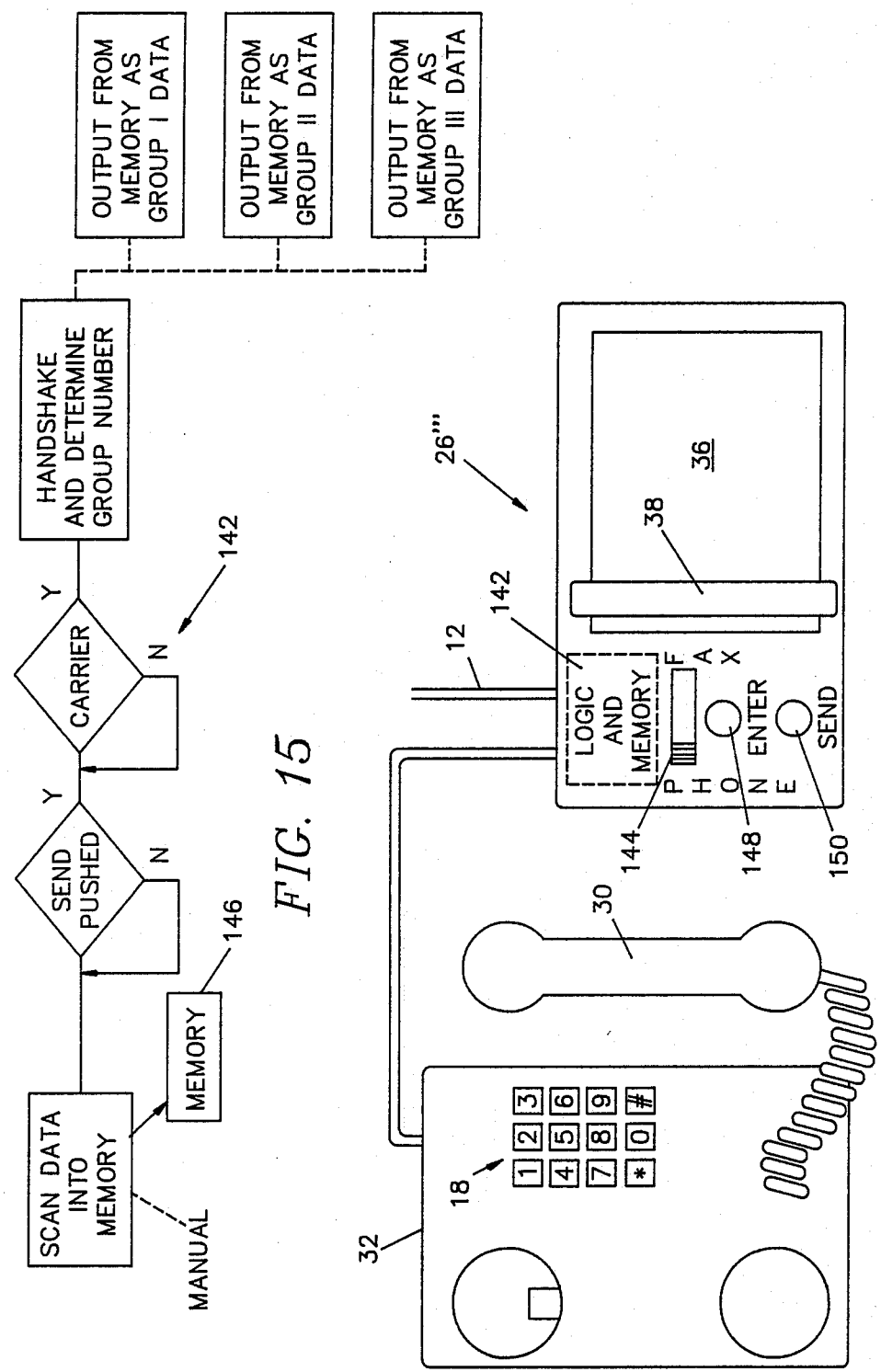

PORTABLE ELECTRONIC OFFICE AND COMPONENTS SUITABLE THEREFOR

BACKGROUND OF THE INVNETION

The present invention relates to electronic office equipment and, more particularly, to a family of simple, inexpensive, and portable electonic devices for business support including: a simple 2-dimensional digitizing device, a simple transmit-only facsimile transmission device, a facsimile transmission system capable of transmitting and receiving simultaneously with a verbal conversation on a telephone line, a simple transmit-only facsimile transmission system, a simple computer-based facsimile system, a dual-mode page reading device for outputting in a digitizing mode or outputting in a text mode for use by alphanumeric-oriented functions, and a portable office.

Electronic equipment for the support of business functions has provided the capability to do many tasks quickly and easily that previously were either impossible or, at best, tedious and prone to mistakes. Unfortunately, most such equipment is very expensive and/or not easily portable. As a consequence, there is a large segment of the business community that has to do without the benefits of such equipment. Small businesses and sole proprietorships are good examples, as are the rapidly rising number of home offices. Such entities have difficulty affording a full gamut of equipment such as personal computer(s), bi-directional FAX, and photocopy equipment. Typically, the most needed is purchased or leased while the remainder is done without. Mailorder purchases, which represent a rapidly growing portion of the business world, often are delayed while a signed request for the order moves through the mails. Outside salespersons, and the like, (which account for a large percentage of total sales) are another "forgotten" portion of the business community when it comes to electronic assistance. While portable and so-called "laptop" computers are now available at reasonable prices, they provide few, if any, useful services for such sales-oriented individuals. The typical salesperson still spends a good portion of each day searching for a working payphone (in all kinds of weather) and standing in a phonebooth with the handset cradled in the crook of his/her neck while sales information as recorded in a notebook or on sales order blanks is verbally relayed to someone back at the main office —often with mistakes on one or both ends. This, of course, leads to mis-shipped merchandise, lowered profits, unhappy customers, etc. Cellular telephones can help relative to some of the foregoing problem; but they are (1) too crowded for use by all such individuals (i.e. greatly increased usage would lead to cellular gridlock), (2) too noisy for the transmission of legible copies by FAX, and (3) too expensive for the average individual.

A typical example of part of the problem is depicted in FIGS. 1 and 2. The standard FAX machine 10 is a bidirectional device which plugs into the telephone line 12. It is unwieldy, requires a lot of power, and is expensive. It does, however, send and receive very high quality copy. To send a facsimile copy of a sheet of paper 14, the sheet of paper is placed in the input hopper 16 of the sending FAX machine 10 and the telephone number of the receiving FAX machine 10 is dialed on the pushbutton pad 18. When the receiving FAX machine 10 answers, the two machines 10 communicate between one another and establish a connection. The sheet of paper 14 is then automatically fed past the read head 20 and the digitized information therefrom sent over the telephone line 12 to the receiving machine 10 where it is used to cause the print head 22 therein to print a facsimile copy thereof on special paper 24 which is fed past the print head 22. A typical, good quality, bi-directional FAX machine 10 costs in the thousands of dollars in today's market and, while it can be carried, it is definitely not what one would consider "easily portable" such that a salesperson would want to carry it to send sales information back to the main office. Furthermore, while the original so-called "Group I" FAX machines employed an acoustic modem for connection to the telephone line (and, therefore, could have been used with a public phone, or the like), most of today's Group II and Group III machines have dispensed with the modem and must have access to a miniature telephone socket into which they can be plugged directly.

One of the major problems of such contemporary equipment (including FAX, photocopy, etc.) is that it provides better quality than is required for many of the uses mentioned above. The typical salesman does not need to receive FAX copies, only transmit them. Such sales inputs, as well as telephone ordering by the home consumer, requires only the transmission of legible copy to determine account numbers, article identification descriptions/numbers, quantity, and, in the case of remotely input purchase vouchers, a validating signature of the ordering party. For the small business, sole practitioner, home office, and the like, copying of documents for file copies does not have to be high quality—merely readable. What in computer circles is referred to as the "jaggies"0 (i.e. lines and characters composed of discrete line segments instead of smooth curves) can be quite acceptable in many circumstances, particularly where it makes the difference between affordability and doing without.

Wherefore, it is the object of the present invention to provide electronic support capability with respect to the digitizing and transmission of pictorial/alphanumeric data which is inexpensive, easily stored, and truly portable.

It is a further object of the present invention to provide a family of minimum capability electronic equipment for business/engineering applications which is particularly useful to small businesses, sole proprietorships, outside salespersons, home offices, and the like.

It is another object of the present invention to provide a basic transmit-only digitizer which can be used as the basic element in a family of minimum capability electronic equipment for business/engineering/home applications, and the like.

Other objects and benefits of the present invention will become apparent from the description which follows hereinafter when taken in conjunction with the drawing figures which accompany it.

SUMMARY

The foregoing objects have been achieved by the family of electronic devices and systems built around a simple 2-dimensional digitizing device comprising, a case; a read bar carried by the case and including a linear read head for developing a first electrical signal at an output thereof reflecting a one dimensional line of viewing of the read head; means for creating relative movement between sheets of material to be digitized and the read bar; and, means for developing a second electrical signal indicating movement of the sheets of material relative to the read bar a pre-defined distance defining the distance between one scanned line of a scanning area and a next the scanned line.

As one preferred member of the family, there is a simple transmit-only facsimile transmission system comprising the foregoing digitizing device and, digital computer means for executing programs stored therein and including a numeric input keyboard, the computer means having a data input operably connected to receive the first and second electrical signals; modem means disposed within the computer for connecting to a telephone line; buffer memory means for receiving the entire digitized contents of a 2-dimensional viewing area created by the relative movement between sheets of material to be digitized and the read bar, the digitized contents of the viewing area comprising a plurality of adjacent lines comprising the first electrical signal over a period of time wherein a new the line is started upon the occurrence of a the second electrical signal; and, first program means operably disposed for execution by the computer means for inputting telephone numbers of receiving facsimile machines through the keyboard, for establishing a connection to a receiving facsimile machine over a telephone line through the modem means, for determining the group type of the receiving machine, and for transmitting the digitized contents of the buffer memory to the receiving machine in the proper format for its the group type.

In one embodiment of the digitizing device designed for manual scanning, the case is a planar case including a compartment defining the scanning area for containing materials to be digitized; the means for creating relative movement between sheets of material to be digitized and the read bar comprises the read bar being mounted for manual movement across the scanning area and parallel thereto, the read bar including the linear read head for developing the first electrical signal at an output thereof reflecting a one dimensional line of viewing of the read head as the head is moved over the scanning area, the read bar further including governor means operably connected for limiting the speed of movement of the read bar over the scanning area; and, the means for developing a second electrical signal includes means for indicating movement of the read bar across the scanning area the pre-defined distance defining the distance between one scanned line of the scanning area and the next scanned line.

In another embodiment of the digitizing device intended primarily for powered operation (wherein manual operation is an alternative), the case is a hollow case including a pair of opposed, contacting rollers for moving sheets of material to be digitized between an input slot and an output slot and includes means for rotating the rollers; the read bar is mounted within the case between the input and output slots transversely across the path of movement of the moving sheets of material and parallel thereto, the read bar includes the linear read head for developing a first electrical signal at an output thereof reflecting a one dimensional line of viewing of the read head as the sheets are moved past the read head; and, the means for developing a second electrical signal includes means for indicating movement of the sheets of material past the read bar the pre-defined distance defining the distance between one scanned line and the next the scanned line.

When employed in the portable office, there is a dot printer means connected to be driven by the computer means for printing a 2-dimensional medium with a plurality of lines of adjacent dots in response to signals at an input thereof and third program means operably disposed in the computer means for execution for transmitting the contents of the buffer memory to the printer means as a signal at the input to be printed thereby whereby the system can be used as a photocopier to copy documents from the simple 2-dimensional digitizing device to the printer means.

In one embodiment, the digitizing device is a dual-mode page reading device for outputting in a digitizing mode or outputting in a text mode for use by alphanumeric-oriented functions comprising in one case the above-mentioned digitizing reader means having a read bar; buffer memory means for receiving the entire digitized contents of a 2-dimensional viewing area created by the relative movement between sheets of material to be digitized and the read bar, the digitized contents of the viewing area comprising a plurality of adjacent lines comprising the first electrical signal over a period of time wherein a new line is started upon the occurrence of a the second electrical signal, the contents of the buffer memory means being output as the output of the digitizing device; switch means for selecting between a digitized mode for the digitizing device and a text mode for the digitizing device; and, conversion logic means connected to sense the switch means for, (1) when the switch means is in a "DIGITIZED" position, filling the buffer memory means with digitized pixel/line format information relative to the scanned contents of the viewing area; and, (2) when the switch means is in a "TEXT" position, operating as an optical character reader by, (2a) first inputting the digitized data to the buffer memory means in digitized pixel/line format;

(2b) when the entire contents of the viewing area has been digitized into the buffer memory, scanning from the "top" to the "bottom" of the "page" represented thereby;

(2c) when a "line" of characters has been isolated and identified, scanning the line from "left" to "right" looking for "character" bit configurations by matching against a list of previously defined alphanumeric character representations on a "best guess" basis;

(2d) as each character of the line is identified, inserting a numerical representation thereof into a next character position in the buffer memory; and, (2e) repeating the process until the entire the buffer memory in digitized format has been scanned and replaced with alphanumeric numerical representations.

In a preferred mode of operation, there are Y-connector means having the telephone line connected to an input thereof, the modem means being connected to a first output thereof and a telephone handset being connected to a second output thereof for simultaneously connecting the modem means and the telephone handset to the telephone line, and wherein the transmitting of the digitized contents of the buffer memory means to the receiving FAX machine is by means of an inaudible carrier frequency whereby the transmitting can take place simultaneously with a conversation on the telephone handset over the telephone line.

DESCRIPTION OF THE DRAWINGS

FIG. 1 is a simplified plan view drawing of a prior art facsimile transmission (FAX) system where each unit is capable of both transmitting and receiving pictorial data over the telephone lines.

FIG. 2 is a partially cutaway sideview drawing of one of the bi-directional FAX units of FIG. 1.

FIG. 3 is a simplified plan view of a transmitting-only FAX unit according to the present invention in a first embodiment intended for connection to a telephone line through an integral handset acoustic-coupling modem.

FIG. 10 is a cutaway side view of a preferred, motor-driven transmit-only digitizing device according to the present invention.

FIG. 11 is a partially cutaway front elevation view of the digitizing device of FIG. 10.

FIG. 14 is a plan view of a preferred embodiment of a transmit-only, manual FAX machine according to the present invention particularly suited for home use in sending voucher copies, or the like, in combination with a telephone conversation to the receiving party.

FIG. 15 is a mixed block and logic diagram depicting the manner of operation of the FAX machine of FIG. 14.

DESCRIPTION OF THE PREFERRED AND ALTERNATE EMBODIMENTS

Figures 4, 5:
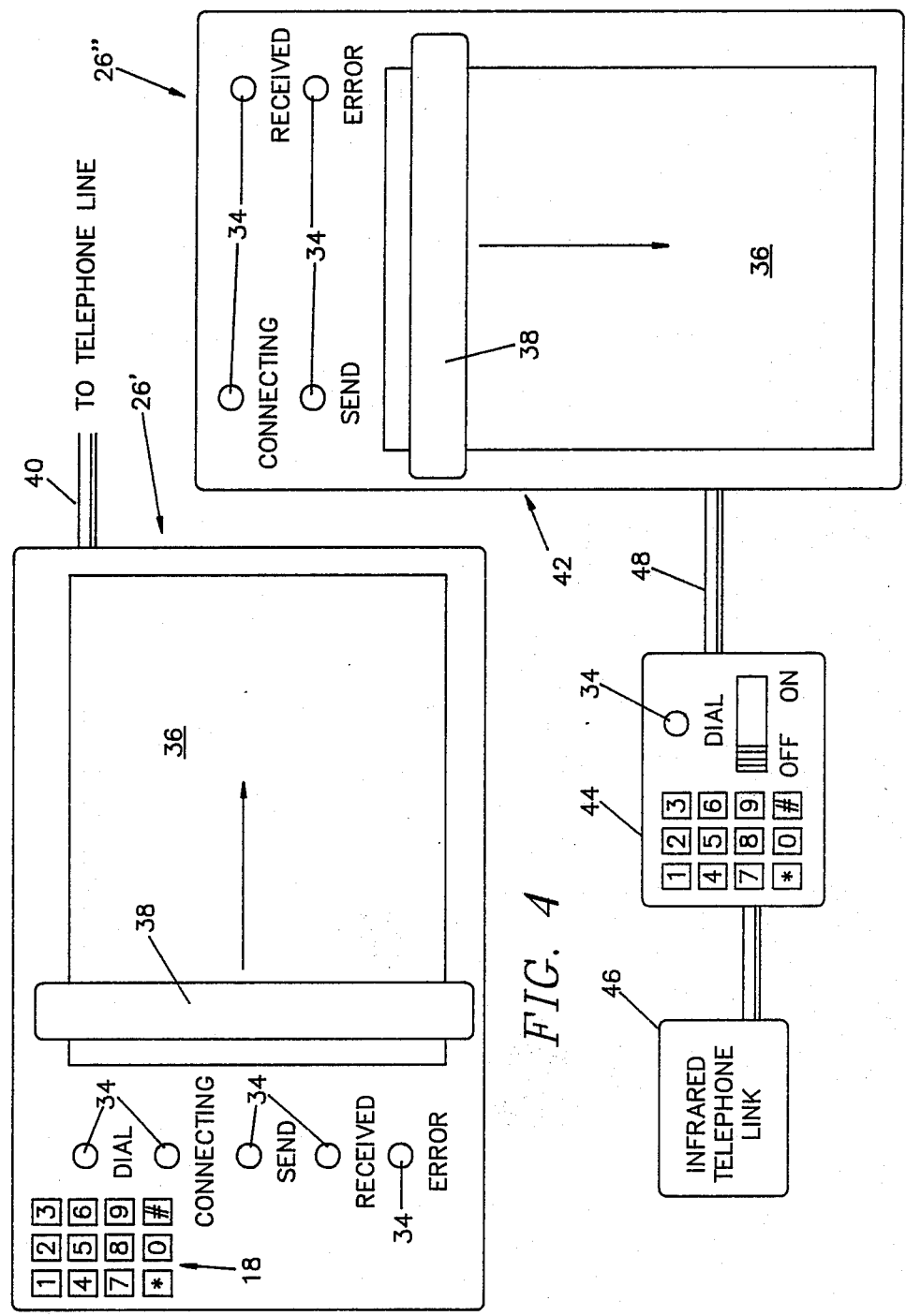
FIG. 4 is a simplified plan view of a transmitting-only FAX unit according to the present invention in a second embodiment intended for direct connection to a telephone line outlet.
FIG. 5 is a simplified plan view of a transmiting-only FAX unit according to the present invention in a third embodiment intended for indirect infrared connection to a telephone line.

The basic element of the present invention is a read-only digitizer which can then be incorporated into a transmit-only FAX machine or a system providing digitized inputs to CAD equipment or the like and/or copy capability through the use of simple dot matrix printing output. This is based on several realizations about the usual approach to electronic support equipment—there is unnecessary duplication of functions, there is the providing of unnecessary functions and capabilities, and the quality of performance is often much greater than necessary. Take the FAX machine of FIGS. 1 and 2, for example. While it is useful for a base location office for sending and receiving pictorial information, the receive functions are virtually useless to the salesperson who only wants to send sales information back to the office or to a consumer trying to place a telephone order where a signed voucher is required. For that salesperson, a very simple, truly portable, battery operated, transmit-only FAX machine would be an important support device. With that, sales memoranda could be relayed quickly and accurately to the bidirectional FAX machine back at the main office. For the consumer, a similar, transmit-only FAX device to be employed in combination with the telephone to allow the transmission of a facsimile of a signed voucher would provide all the capability required to complete the transaction. In this latter regard, it is worthy of note that while credit sales from the home via telephone have increased dramatically of late, misuse of the process as presently implemented without the use of signed vouchers has also increased correspondingly to the point where some lending institutions are hesitant to continue (or have even discontinued) supporting retailers operating in a telephone credit mode. Obviously, some solution to the problem must be provided which can solve the needs of all parties involved. A simple, send-only FAX capability at the consumer's site is one possibility.

A transmit-only FAX machine according to the present invention in a first embodiment is shown in FIG. 3 wherein it is generally indicated as 26. The FAX machine 26 includes an acoustically coupled modem 28 wherein the handset 30 of a standard touch-tone telephone 32 can be inserted to affect a connection to the telephone line 12. The FAX machine 26 includes logic for interconnecting to a bi-directional FAX machine such as 10, or the like, and for causing the proper "handshake" sequences as are known in the art. Instead of automatic operation, the FAX machine includes indicating light emitting diodes (LEDs) 34 to indicate to the user what actions are to be taken manually. In use, the handset 30 is placed in the openings for the modem 28. When a dial tone is detected by the logic in the FAX machine 26, it lights the "DIAL" LED 34. The user then inputs the telephone number of the FAX machine 10 to which the transmission is directed on the pushbutton dial pad 18 of the telephone 32. When a "carrier" signal from the receiving FAX machine 10 is detected, the logic lights the "CONNECTING" LED 34 and performs the usual handshaking functions to prepare the two FAX units 10, 26 for transmission. When the two FAX units 10, 26 are ready for transmission, the logic lights the "SEND" LED 34. The material to be transmitted has been previously placed in the 8½ inch by 11 inch viewing compartment 36 provided therefor. Upon seeing the SEND indication, the user manually moves the read bar 38 across the viewing compartment 36, causing the contents of the compartment to be digitized and output over the telephone line 12 to the FAX machine 10 in the usual manner. As with more expensive and complex units, the read bar 38 contains a light source to illuminate the contents of the viewing compartment and a charge coupled device (CCD) type of read head for developing a one-dimensional signal for each line of pixels at 0.01–0.005 inch intervals. Such devices and the manner of constructing same are easily constructed by those skilled in the art without undue experimentation from prior knowledge and, therefore, in the interest of simplicity and to avoid redundancy, such aspects of the present invention (like the specifics of the logic) are not set forth in any greater detail. Following transmission, the machine 10 sends a signal back to the machine 26 indicating whether the transmission was successfully received or not. The logic in the FAX machine 26 lights either the "RECEIVED" or "ERROR" LED 34, as appropriate, and the user acts accordingly by either repeatnng the transmission or proceeding. As those skilled in the art will appreciate, for use by a home consumer for transmitting facsimiles of credit vouchers for telephone ordering, the viewing compartment 36 would only have to be approximately 3×5 inches in size and the machine 26 could be connected directly into the phone line 12 with a "Y" connector to allow both the machine 26 and the telephone 32 to be used simultaneously. The user, when directed by the receiving party, would simply move the read bar 38 across the viewing compartment 36 to transmit the voucher copy.

A second embodiment of the transmit-only FAX machine 26' of the present invention is shown in FIG. 4. In this embodiment, it is assumed that access can be had to a telephone line outlet whereas the prior embodiment of FIG. 3 was intended for use in a telephone booth, motel/hotel room, or the like, where the telephone is directly connected to the telephone line without the benefit of a removable plug. The o FAX machine 26' of FIG. 4 has a connecting cable 40 with a standard plug (not shown) on the end thereof for plugging into a standard, miniaturized telephone outlet. A touchtone dialing pad 18 is also included therein. Other than that, the construction and manner of operation are substantially identical to the above-described embodiment of FIG. 3. By adding a handset to the machine 26', a useful telephone for the home credit consumer with need to transmit credit voucher copies could be provided.

A third embodiment of a transmit-only FAX machine according to the present invention is shown in FIG. 5 wherein it is generally indicated as 26". This particular embodiment is intended primarily for use from a car, van, or such, in conjunction with a remote infrared telephone connection as described in detail in co-pending application Ser. No. 179,661, filed Apr. 8, 1988, and entitled REMOTE PUBLIC TELEPHONE LINK, the teachings of which are incorporated herein by reference. To show the optional nature thereof, it will be noted that the digitizing portion 42 is oriented 90 degrees from the prior embodiments for reading by a vertical downward motion of the read bar 38 instead of by a horizontal motion thereof. In this embodiment, the "DIAL" LED 34 is included with the dial pad unit 44 which is connected between the digitizing portion 42 and the infrared telephone link 46. Using this embodiment, a salesperson can operate from the comfort of his or her own car to transmit sales information back to the home office. The car need only be positioned adjacent a public telephone location provided with remote infrared telephone connection capability as described in the above-referenced co-pending application. The infrared telephone link 46 is directed towards the emitter-/receiver of the public telephone location. When a connection is established to an available telephone line, the "DIAL" LED 34 is illuminated as in the previous embodiments. Thereafter, operation is substantially identical to that previously described herein.

A fourth embodiment of a transmit-only FAX machine according to the present invention is shown in FIGS. 14 and 15 wherein it is generally indicated as 26'''. This particular embodiment is intended primarily for use in combination with a telephone 32 being employed by a home consumer, or the like, to make a credit purchase wherein a facsimile voucher is provided to the retailer for verified billing purposes to the consumer's bank or lending institution. The FAX machine 26''' of this embodiment could, of course, be employed for other purposes as well. As those skilled in the art will recognize, this embodiment is a very basic approach to facsimile transmissions which allows interfacing with a broad variety of receiving devices by a very simple and inexpensive device on the sending end. This would be quite important in uses such as that being described as the principle objective where consumers will, in general, be unwilling to pay over a token amount for such a device. In the alternative, the lending institutions, or the like, would make such devices available to their credit customers on request. They too would want as inexpensive an approach as possible. In this embodiment, the compartment 36 would be just under 3/5 inches. That, coupled with a 100×100 resolution, would allow the buffer memory 146 within the logic and memory 142 of the machine 26''' to be 16K for minimum cost. The telephone line 12 is input to a two position switch 44 which allows the user to manually select its connection to either the telephone 32 or the the logic and memory 142 of the machine 26'''. It should be noted that if the audible carrier employed in the FAX transmission process is replaced with an inaudible carrier, the switch 144 can be replaced by a simple "Y" connector to place the telephone 32 and FAX machine 26''' to be connected to the telephone line 12 in parallel such that conversation and FAX transmission can occur simultaneously.

The manner of operation of this embodiment is depicted in the combined block and logic flow diagram of FIG. 15. The consumer prepares the voucher to be employed while conversing with the retailer over the telephone 32. When it has been completed and signed, it is placed in the compartment 36 and the ENTER button 148 depressed to signal the logic and memory 142 that the data in the memory 146, if any, is to be replaced. The read bar 38 is manually moved over the compartment 36 causing the 2-dimensional contents thereof, i.e. the voucher, to be digitized and the digitized representation thereof on a line-by-line basis to be stored in the buffer memory 146. When directed by the retailer to send the voucher facsimile, the consumer changes the switch 144 to the FAX position and depresses the SEND button 150. As shown in FIG. 15, the logic within the logic and memory 142 waits for the SEND button 150 to be depressed. Once pressed, the logic waits until it senses a carrier signal from the receiver. When that is detected, it goes through the usual handshaking procedure whereby it determines the group type of the receiver (i.e. Group I, II or III at present). It then sends the data from the memory 146 in the manner appropriate for the receiving FAX unit. When the transmission is complete, the consumer is informed by a light or audible signal as in the previous embodiments, at which time the switch 144 is returned to the PHONE position to allow the transaction to be completed verbally. This, of course, includes the verification of receipt of a legible facsimile of the voucher. Again, if an inaudible carrier is employed, the completion and receipt of the facsimile can be verified over the telephone as it happens.

Figure 6:
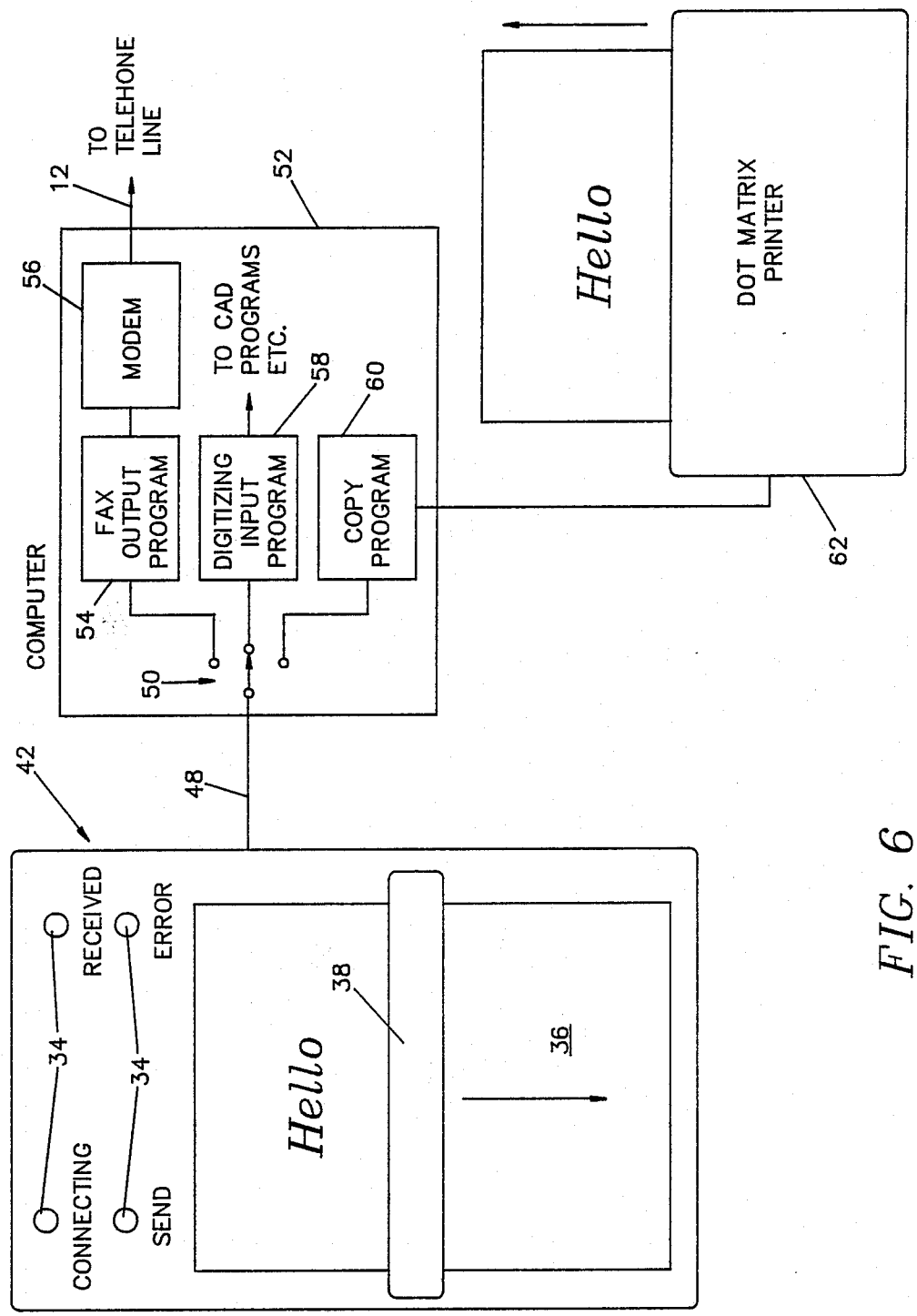
FIG. 6 is a simplified plan view of a multi-purpose system employing the manually operated digitizing device of FIGS. 3-5 to selectively do transmit-only FAX transmission, digitize a viewing area for CAD input, or the like, or perform direct copying to a dot matrix printer of the contents of the viewing area.

While the above-described digitizing portion 42 is useful as presented, recognizing the general capabilities thereof, the duplication of functions and capabilities in most electronic apparatus, and the potential of the personal computer(s) contained in most offices allows the present invention as described heretofore to be employed to greater benefit by a few simple additions. For example, as shown in FIG. 6, the digitized data stream out of the digitizing portion 42 on line 48 can be input to a switch 50 contained in the computer 52 (or in the logic of the digitizing portion 42). The digitized data is then selectively sent to one of three locations. If the FAX mode is selected, the data goes to a FAX output program 54 connected to a modem 56 which, in turn, is connected to the telephone line 12. In this mode, operation is substantially as described above. If the user has a personal computer with a built-in modem, however, duplication can be avoided by employing those capabilities with a stripped down version of the digitizing portion 42; that is, basically only the scanning bar 38, a buffer memory to receive the data, and some minimum logic. Such would also be true of a voucher scanner connected to a home telephone for credit purchasing. If the DIGITIZING mode is selected, the digitized data is input to a buffer (not shown) by the digitizing input program 58 and control passed to a CAD program, or the like, for appropriate use. Finally, in the COPY mode, the digitized data is employed on a line-by-line basis by the copy program 60 to directly drive a dot matrix printer 62, thus providing a basic document copying capability. While not high quality, the copies provided would not be on special paper which ultimately fades (as with most FAX machines in the low to medium price range) and would be sufficient for most small businesses, home offices, and the like, for file copies, etc. in instances where no photocopying capability was available. In this regard, the computer 52, modem 56, and copy program 60 could, of course, be employed to allow receipt of FAX transmissions as well. The received FAX transmission would be read into a receive buffer in the memory and then be printed out on the dot matrix printer as with other "graphics" programs implemented on personal computers. Again, the copy provided by the dot matrix printer would not be high quality; but, would be sufficient to provide a hard copy readable document in instances where the more costly FAX equipment is not available. Where available, a laser printer could be employed as the "dot matrix printer" to provide better print quality.

Figure 8:
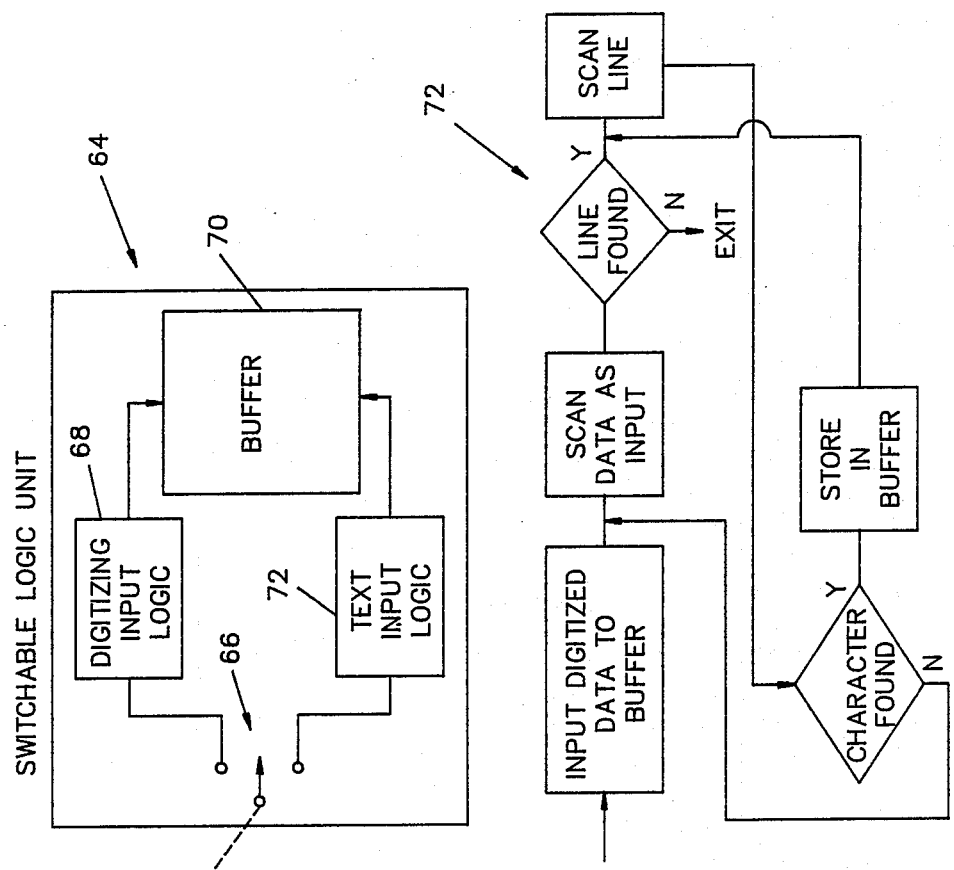
FIG. 8 is a logic diagram showing the preferred manner of operation of the character recognition mode in the device of FIG. 7.
Figure 7:
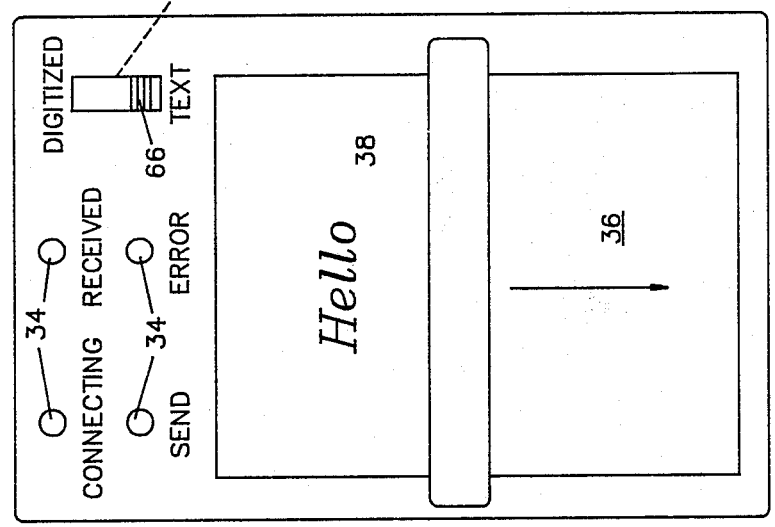
FIG. 7 is a combined simplified plan view and block diagram showing a preferred dual mode functional construction for the manually operated digitizing device of FIGS. 3-5.

Another modification which could be made to the digitizing portion 42 to increase it capabilities is shown in FIGS. 7 and 8. In this embodiment, the digitizing portion 42' includes the switchable logic unit generally designated as 64 therein. When the switch 66 is placed in the "DIGITIZED" position, the digitizing input logic 68 fills the buffer 70 with digitized pixel information relative to the scanned contents of the viewing compartment 36. With the switch 66 in the "TEXT" position, however, the text input logic 72, shown in greater detail in FIG. 8, causes the digitizing portion 42' to operate as an optical character reader (OCR) for inputting to alphanumeric-oriented functions such as word processing programs, and the like. As shown in FIG. 8, the digitized data is first input to the buffer 70 in digitized or pixel/line format as in the digitizing mode. When the entire contents of the viewing compartment 36 has been digitized into the buffer 70, however, the data in the buffer 70 is then scanned from the "top" to the "bottom" of the 8½×11 inch "page" represented thereby. Once a "line" has been identified, the line is scanned from "left" to "right" looking for "character" bit configurations which are then matched against a list of alphanumeric characters on a "best guess" basis. As each character of the line is identified, the numerical representation thereof is inserted into the next character position in the buffer 70. This process is repeated until the entire buffer in digitized format has been scanned and replaced with alphanumeric numerical representations. Margin spacing could, of course, be monitored as an indication of the beginning of paragraphs in a manner well know in the OCR art and appropriate error substitutions, etc. provided.

Figure 9:
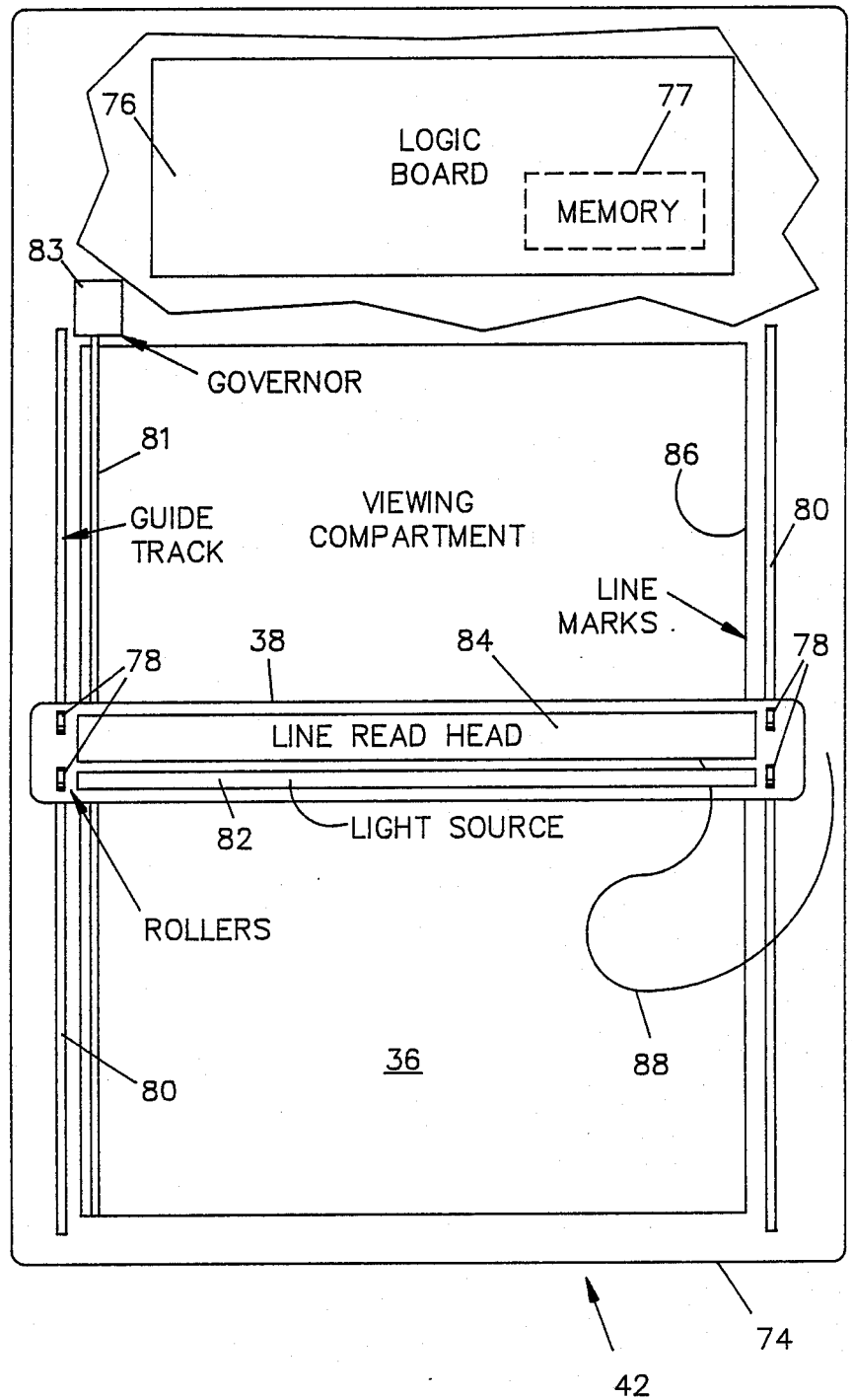
FIG. 9 is a simplified partially cutaway plan view showing the preferred functional mechanical construction for the manually operated digitizing device of FIG. 7.

Turning to FIG. 9, the mechanical aspects of the digitizing portion as hereinbefore employed will now be addressed briefly. Again, the construction of such a device based on prior knowledge is well within the capability of those skilled in the art and, therefore, major details will be avoided in the interest of simplicity. As depicted in the figure, the digitizing portion 42 comprises a hollow, plastic, rectangular case 74 having an 8½×11 inch depressed viewing compartment 36 therein into which a sheet of paper or a collage of flat articles can be placed for scanning. For voucher reading by a home sending unit, the compartment 36 would only have to be approximately 3×5 inches, of course. If desired, a thin, clear, sheet of plastic can be provided to cover the compartment 36 and hold its contents stable during scanning. Likewise, a plastic "half-toning" sheet could be used, if desired, for the purpose in a manner well known in the art when sending photographs, and the like. The logic, LEDs, switches, and the like, are mounted on the logic board 76 contained within the case 74. Logic board 76 also contains memory 77 as necessary for buffers, etc. The read bar 38 is moved accurately over the compartment 36 by rollers 78 mounted on the outer ends of the bar 38 moving along a pair of parallel guide tracks 80 disposed along the sides of the compartment 36. Other means could, of course, be used. For the voucher-reader type of device, construction could be very similar to the mechanical devices presently used as imprinter for credit cards. It is preferred that the bar 38 be moved along a threaded rod 81, or the like, the rotation of which is controlled by a governor 83 so as to control the speed of movement of the bar 38 and prevent it from being moved over the compartment 36 at too fast a speed for accurate digitizing. Many techniques for mechanically controlling the speed of the bar 38 will be readily apparent to those skilled in the art and, therefore, that aspect will not be addressed further. For example, the bar 38 could be connected with wire cable to drive a paddle rotating in a viscous liquid. The read bar 38 preferably includes a light source 82 for illuminating the contents of the compartment 36 directly under the bar 38 as it is moved over the compartment 36. For digitizing small copy such as vouchers, it may be found to be preferable to illuminate the compartment 36 from a fixed light source adjacent one end edge thereof. The bar 38 further includes a one-dimensional line read head 84. The read head 84 is preferably of the charge coupled device (CCD) variety, the manner of operation of which is well known in the art. To allow freedom of movement and reliable electrical connection, the head 84 is connected to the logic board 76 by flexible cable 88. As the read head 84 is moved over the compartment 36, an electrical signal is output on the cable 88 reflecting the one dimensional line of viewing of the head 84. The edge of the compartment 36 is provided with line marks 86 which are also detected by an appropriate sensor contained within the read head 84. The line marks 86 may occur 100 to the inch to provide line signals for the typical FAX line resolution level or may occur 300 to the inch for greater resolution in other digitizing applications. In such case, for FAX use every third mark 86 could be employed as a scan line marker. The same is true with the read head 84. While a resolution of 100 pixels to the inch across the read head 84 may be preferred in order to produce a very low cost device giving acceptable FAX scanning and transmission capabilities, higher resolution applications may require 200–300 pixels to the inch—at higher manufacturing costs. It should also be appreciated that high resolutions will require larger buffers in the memory 77 into which to move the data between the time of scanning and transmission. For example, an 8½×11 inch, low resolution system having 100×100/per inch resolution would require a 116,875 byte buffer while a high resolution 300×300/per inch system would require almost a Mbyte of buffer memory. On the other hand, a low resolution voucher scanning system could probably be implemented with only 16K of buffer memory.

Turning now to FIGS. 10 and 11, a compact, mechanical, transmit-only digitizer 90 according to a preferred embodiment of the present invention for portable use is shown. The digitizer 90 comprises a plastic case 92 in which a pair of parallel, contacting rollers 94 are mounted for rotation. The rollers 94 are driven by a gear drive 96 by electric motor 98. Optionally, the motor 98 could be a spring drive motor or a hand crank. Power can be provided at 99 by internal batteries (replaceable or rechargable), an AC adapter, and/or by plugging the unit into the cigarette lighter of a vehicle in a manner well known in the art for powering such portable electronic devices. A detector 100 is disposed to sense the movement of the teeth of an appropriate one of the gears in the drive 96 to, thereby, provide a signal to the logic board 76 indicating the movement by a paper 24 being scanned of one line distance (e.g. 0.01 inch). The case 92 is provided with an input slot 102 and an output slot 104. A sheet of paper 24 inserted into the input slot 102 is gripped between the rollers 94, passed under a read bar 38' affixed transversely within the case 92 and parallel to the rollers 94, and output through the slot 104. As can be appreciated, such a device can be made quite small in size (possibly 4×4×12 inches) for incorporation into devices such as the portable office of the present invention now to be described. As a desk top unit, however, its small size would also be of benefit over prior art digitizing devices which typically require a large amount of space. It could also be carried easily in a briefcase, or the like, for use by salesmen, and others, at remote locations.

Figure 12:
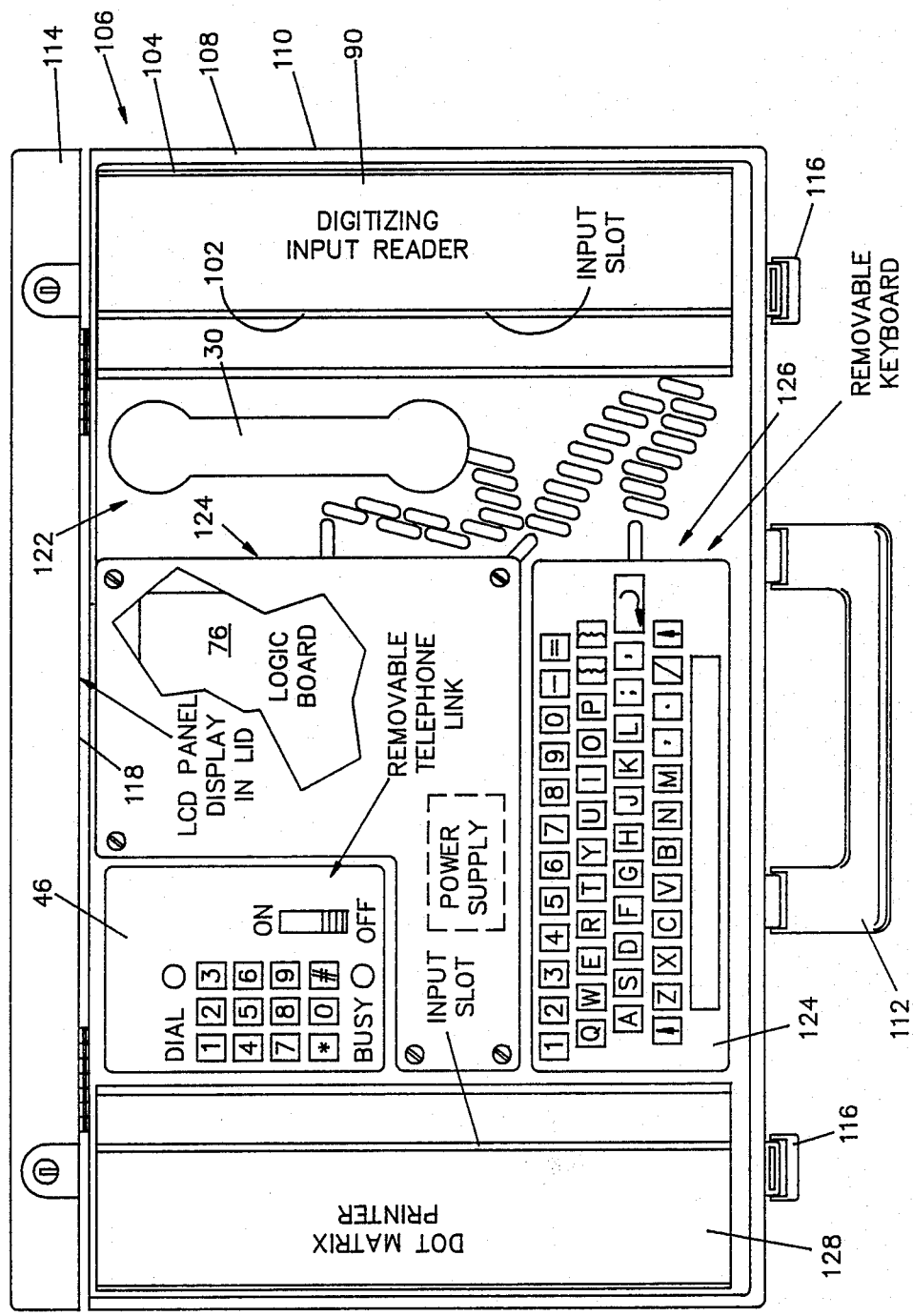
FIG. 12 is a plan view of a portable electronic office according to the present invention incorporating the digitizing device of FIGS. 10 and 11.

Turning now to FIG. 12, a portable office particularly suited for the uses of outside salespersons, and the like, is shown. The portable office, generally indicated as 106, is contained within a "briefcase" type of housing 108 having a case 110 with a handle 112 for carrying and a lid 114 hingedly attached to the case 110 and securable thereto in the closed position by means of latches 116. The lid 114, shown in its opened position, contains a liquid crystal display (LCD) panel 118 therein for viewing of displayed information in a manner to be described shortly. The LCD panel 118 is connected to the logic board 76 contained within the central housing area 124 of case 110 by a connecting cable 130 (shown in FIG. 13). A removable telephone handset 30 is connected to the logic 76 and contained within an area 122 provided therefor. A removable keyboard 124 of the membrane switch type is also connected to the logic 76 and contained within an area 126 provided therefor. There is also a removable infrared telephone link 46 of the type previously mentioned and described in detail in the above-referenced, co-pending patent application. A digitizer 90 of the type previously described with respect to FIGS. 10 and 11 is mounted in the case 110 along one side of the case 110 and a small dot matrix printer 128 of a type well within the capabilities of the prior art is mounted along the other side. Both the digitizer 90 and printer 128, of course, are operably connected to the logic 76. As those skilled in the art will appreciate, all the features described above do not have to be included. What is being described is the preferred embodiment of the portable office 106. Subsets could, of course, be perfectly acceptable in some instances and are considered to be within the scope and spirit of the present invention. What is intended, as stated in the objects above, is the providing of a family of electronic support devices which are inexpensive, truly portable, and particularly suited to the needs of individuals not presently serviced by the art. A preferred manner of operation of the portable office 106 and the logic 76 contained therein in combination with the other components will now be described in detail.

Initially, the telephone link 46 is used to establish a telephone line connection to the main office, or the like. While prior art computer/FAX systems employ an audible carrier such that simultaneous voice and computer transmissions cannot take place, it is preferred that the computer and/or FAX data being transmitted be modulated on an inaudible carrier signal such that the user can have voice conversation with a person on the other end while the system is in use. As those skilled in the art will recognize, the components of the portable office would allow it to be connected into a time-sharing computer as a so-called "dumb terminal" whereby remote access to the company computer could be accomplished. Most outside salespersons, and the like, are not computer oriented and, therefore, this potential capability is not the primary thrust of the present invention and will not be discussed further.

Once the voice link with the home office is established, business can be conducted in a conversational mode supported by the electronic capabilities of the portable office 106. Sales orders can be input by the digitizer 90 and sent simultaneously with the conversation to the FAX machine at the office (or independently, if desired). Simple word processing capability in the logic 76 would allow the user to type simple messages and memos on the keyboard 124 to be printed on the printer 128. Simple copies of documents can, of course, be made by scanning with the digitizer 90 and printing what is scanned directly on the printer 128 as previously described. In similar manner, visual information can be sent to the user from the main office either from the home computer or from their FAX machine for display on the LCD panel 118. Hard copy can then be obtained by a screen dump from the memory which is the map of the LCD panel 118 to the printer 128.

Figure 13:
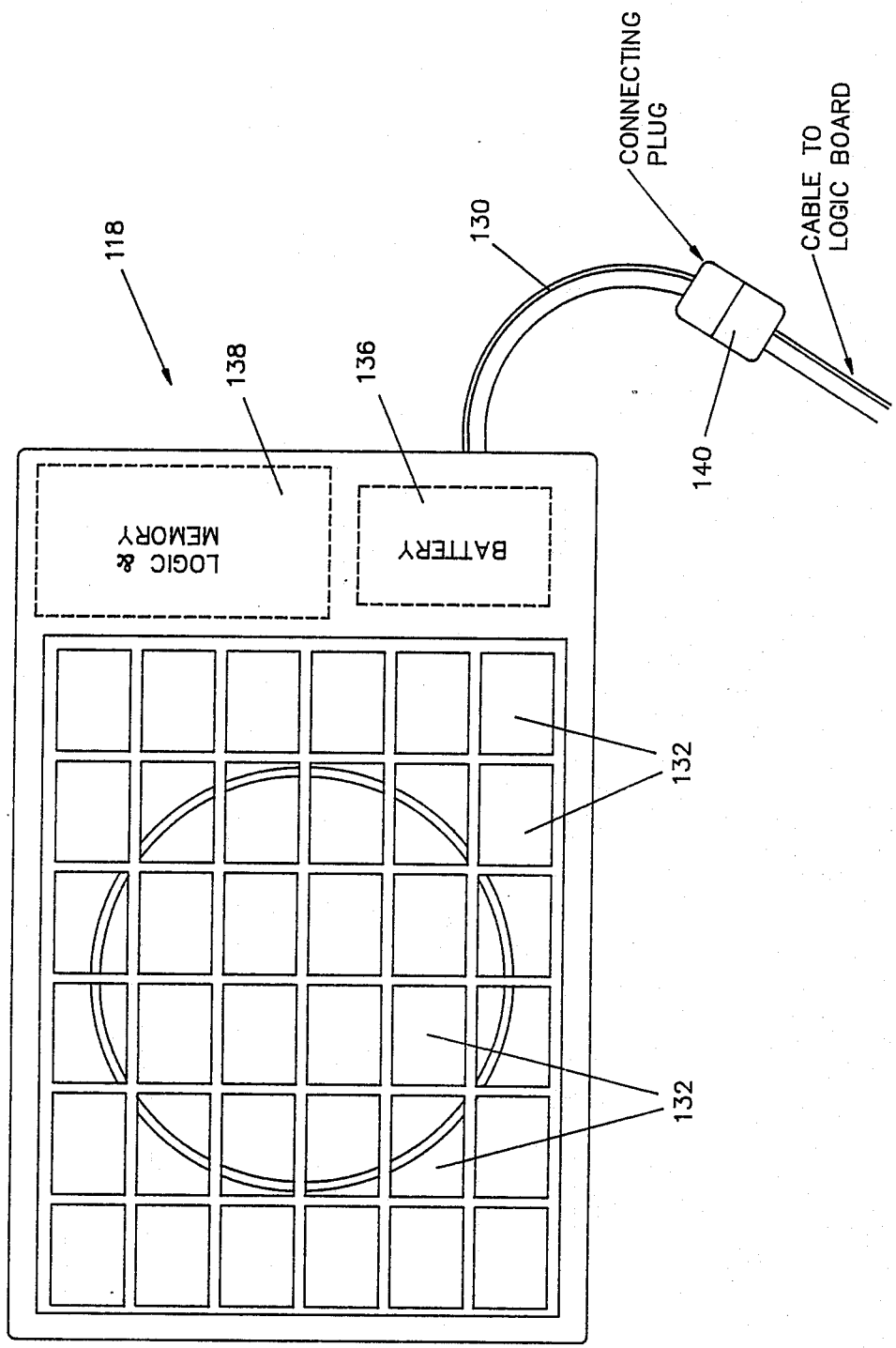
FIG. 13 is a plan view of a removable display panel as usable in the portable office of FIG. 12 for providing copies by placing the panel in a standard photocopy machine.

In an alternate embodiment, the LCD panel 118 is made to be removable as shown in FIG. 13 such that copies can be made by placing the panel 118 in a photocopy machine. As shown therein contemporary LCD technology is not able to produce a letter sized panel inexpensively. Thus, it is envisioned that the panel 118 will be comprised of a plurality of close adjacent sub-panels 132 held in a frame 134. The frame 134 also includes a battery 136 and logic and memory 138 all operably connected to drive the sub-panels 132 according to information provided over connecting cable 130. The cable 130 includes a plug 140 to allow the panel 118 to be removed and taken to a photocopy machine for copying. When the plug 140 is pulled, the battery 136 causes the sub-panels 132 to continue to display the data last input into the memory 138.

Thus, it can be seen from the foregoing description that the present invention has met its stated objectives by providing a family of electronic support devices which are inexpensive, truly portable, and particularly suited to the needs of individuals not presently being provided for. The heart of this family is a simple digitizing device which can be manually operated in many instances to provide digitized scanning data for transmit-only facsimile transmissions of sales orders, and the like, by outside salesmen and home consumers making credit purchases.

Wherefore, having thus described the present invention, what is claimed is:

1. A simple 2-dimensional digitizing device comprising:
   (a) a planar case including a scanning area for containing materials to be digitized;
   (b) a read bar mounted for movement across said scanning area and parallel thereto, said read bar including a linear read head for developing a first electrical signal at an output thereof reflecting a one dimensional line of viewing of said read head as said head is moved over said scanning area, said read bar further including means for manually moving said read bar over said scanning area;
   (c) means for developing a second electrical signal indicating movement of said read bar across said scanning area a pre-defined distance defining the distance between one scanned line of said scanning area and the next said scanned line;
   (d) governor means operably connected to said read bar for limiting the speed of movement of said read bar over said scanning area;
   (e) a buffer memory for receiving the entire digitized contents of said viewing area as said viewing area is scanned by said read bar; and,
   (f) logic means for establishing a connection to a receiving facsimile machine over a telephone line, for determining the group type of said receiving machine, and for transmitting the digitized contents of said buffer memory to said receiving machine in the proper format for its said group type.

2. The simple 2-dimensional digitizing device of claim 1 and additionally comprising:
   (a) first switch means operably connected for sensing by said logic means; and wherein said logic means includes,
   (b) logic for replacing the contents of said buffer memory with the entire digitized contents of said viewing area as said viewing area is scanned by said read bar only after said first switch means has been activated and sensed.

3. The simple 2-dimensional digitizing device of claim 1 and additionally comprising:
   (a) second switch means operably connected for sensing by said logic means; and wherein said logic means includes,
   (b) logic for for determining the group type of said receiving machine, and for transmitting the digitized contents of said buffer memory to said receiving machine in the proper format for its said group type only after said second switch means has been activated and sensed.

4. The simple 2-dimensional digitizing device of claim 1 and additionally comprising:
   third switch means having said telephone line connected to an input thereof, said logic means connected to a first output thereof and a telephone connected to a second output thereof for selectively connecting said logic means or said telephone to said telephone line.

5. The simple 2-dimensional digitizing device of claim 1 and additionally comprising:
   (a) Y-connector means having said telephone line connected to an input thereof, said logic means connected to a first output thereof and a telephone connected to a second output thereof for simultaneously connecting said logic means and said telephone to said telephone line; and wherein,
   (b) said transmitting of the digitized contents of said buffer memory to said receiving machine is by means of an inaudible carrier frequency whereby said transmitting can take place simultaneously with a conversation on said telephone over said telephone line.

6. The simple 2-dimensional digitizing device of claim and additionally comprising:
   (a) a buffer memory disposed in said case of sufficient capacity to receive the entire digitized contents of said viewing area as said viewing area is scanned by said read bar;
   (b) fourth switch means carried by said case for selecting between a digitized mode for the digitizing device and a character mode for the digitizing device; and,
   (c) conversion logic means disposed in said case and connected to sense said fourth switch means for,
      (c1) when said fourth switch means is in a "DIGITIZED" position, filling said buffer memory with digitized pixel/line format information relative to the scanned contents of said viewing area; and,
      (c2) when said fourth switch means is in a "TEXT" position, operating as an optical character reader (OCR) for inputting to alphanumeric-oriented functions such as word processing programs, and the like, by,
         (c2a) first inputting the digitized data to said buffer memory in digitized pixel/line format;
         (c2b) when the entire contents of said viewing area has been digitized into said buffer memory, scanning from the "top" to the "bottom" of the "page" represented thereby;
         c2c) when a "line" of characters has been isolated and identified, scanning the line from "left" to "right" looking for "character" bit configurations by matching against a list of previously defined alphanumeric character representations on a "best guess" basis;
         (c2d) as each character of the line is identified, inserting the numerical representation thereof into a next character position in said buffer memory; and,
         (c2e) repeating the process until the entire said buffer memory in digitized format has been scanned and replaced with alphanumeric numerical representations.

7. The simple 2-dimensional digitizing device of claim and additionally comprising:

(a) logic means for establishing a connection to a receiving facsimile machine over a telephone line, for determining the group type of said receiving machine, and for transmitting the digitized contents of said buffer memory to said receiving machine in the proper format for its said group type;

(b) first light means for lighting in the presence of a dial tone on said telephone line; and wherein, (c) said logic means including means for sensing a dial tone on said telephone line and for activating said first light means when a dial tone is sensed.

8. The simple 2-dimensional digitizing device of claim 1 and additionally comprising:

(a) logic means for establishing a connection to a receiving facsimile machine over a telephone line, for determining the group type of said receiving machine, and for transmitting the digitized contents of said buffer memory to said receiving machine in the proper format for its said group type;

(b) second light means for lighting in the presence of a carrier signal on said telephone line; and wherein, (c) said logic means including means for sensing a carrier signal on said telephone line and for activating said second light means when a carrier signal is sensed.

9. The simple 2-dimensional digitizing device of claim 1 and additonally comprising:

(a) logic means for establishing a connection to a receiving facsimile machine over a telephone line, for determining the group type of said receiving machine, and for transmitting the digitized contents of said buffer memory to said receiving machine in the proper format for its said group type;

(b) second light means for lighting in the presence of a carrier signal on said telephone line; and wherein, (c) said logic means including means for sensing a carrier signal on said telephone line and for activating said second light means when a carrier signal is sensed.

10. The simple 2-dimensional digitizing device of claim 1 and additionally comprising:

(a) logic means for establishing a connection to a receiving facsimile machine over a telephone line, for determining the group type of said receiving machine, and for transmitting the digitized contents of said buffer memory to said receiving machine in the proper format for its said group type;

(b) third light means for lighting in the presence of a ready to receive signal on said telephone line; and wherein, (c) said logic means including means for sensing a ready to receive signal on said telephone line and for activating said third light means when a ready to receive signal is sensed.

11. The simple 2-dimensional digitizing device of claim 1 and additionally comprising:

(a) logic means for establishing a connection to a receiving facsimile machine over a telephone line, for determining the group type of said receiving machine, and for transmitting the digitized contents of said buffer memory to said receiving machine in the proper format for its said group type;

(b) fifth light means for lighting in the presence of an error at the end of transmission signal on said telephone line; and wherein, (c) said logic means including means for sensing an error at end of transmission signal on said telephone line and for activating said fifth light means when an error at the end of transmission signal is sensed.

12. A simple 2-dimensional digitizing device comprising:

(a) a hollow case carrying a pair of opposed, contacting rollers therein for moving sheets of material to be digitized between an input slot and an output slot;

(b) means for rotating said rollers;

(c) a read bar mounted within said case between said input and output slots transversely across the path of movement of said moving sheets of material and parallel thereto, said read bar including a linear read head for developing a first electrical signal at an output thereof reflecting a one dimensional line of viewing of said read head as said sheets are moved past said read bar;

(d) means for developing a second electrical signal indicating movement of said sheets of material past said read bar a pre-defined distance defining the distance between one scanned line of said sheets and a next said scanned line;

(e) a buffer memory for receiving the entire digitized contents of a viewing area as said viewing area is scanned by said read bar; and, (f) logic means for establishing a connection to a receiving facsimile machine over a telephone line, for determining the group type of said receiving machine, and for transmitting the digitized contents of said buffer memory to said receiving machine in the proper format for its said group type.

13. The simple 2-dimensional digitizing device of claim 12 and additionally comprising:

(a) first switch means operably connected for sensing by said logic means; and wherein said logic means includes, (b) logic for replacing the contents of said buffer memory with the entire digitized contents of said viewing area as said viewing area is scanned by said read bar only after said first switch means has been activated and sensed.

14. The simple 2-dimensional digitizing device of claim 12 and additionally comprising:

(a) second switch means operably connected for sensing by said logic means; and wherein said logic means includes, (b) logic for for determining the group type of said receiving machine, and for transmitting the digitized contents of said buffer memory to said receiving machine in the proper format for its said group type only after said second switch means has been activated and sensed.

15. The simple 2-dimensional digitizing device of claim 12 and additionally comprising:

third switch means having said telephone line connected to an input thereof, said logic means connected to a first output thereof and a telephone connected to a second output thereof for selectively connecting said logic means or said telephone to said telephone line.

16. The simple 2-dimensional digitizing device of claim 12 and additionally comprising:

(a) Y-connector means having said telephone line connected to an input thereof, said logic means connected to a first output thereof and a telephone connected to a second output thereof for simultaneously connecting said logic means and said telephone to said telephone line; and wherein, (b) said transmitting of the digitized contents of said buffer memory to said receiving machine is by means of an inaudible ready to receive frequency whereby said transmitting can take place simultaneously with a conversation on said telephone over said telephone line.

17. The simple 2-dimensional digitizing device of claim 12 and additionally comprising:
(a) a buffer memory disposed in said case of sufficient capacity to receive the entire digitized contents of a viewing area scanned by said read bar;
(b) fourth switch means carried by said case for selecting between a digitized mode for the digitizing device and a character mode for the digitizing device; and,
(c) conversion logic means disposed in said case and connected to sense said fourth switch means for,
   (c1) when said fourth switch means is in a "DIGITIZED" position, filling said buffer memory with digitized pixel/line format information relative to the scanned contents of said viewing area; and,
   (c2) when said fourth switch means is in a "TEXT" position, operating as an optical character reader (OCR) for inputting to alphanumeric-oriented functions such as word processing programs, and the like, by,
      (c2a) first inputting the digitized data to said buffer memory in digitized pixel/line format;
      (c2b) when the entire contents of said viewing area has been digitized into said buffer memory, scanning from the "top" to the "bottom" of the "page" represented thereby;
      (c2c) when a "line" of characters has been isolated and identified, scanning the line from "left" to "right" looking for "character" bit configurations by matching against a list of previously defined alphanumeric character representations on a "best guess" basis;
      (c2d) as each character of the line is identified, inserting a numerical representation thereof into a next character position in said buffer memory; and,
      (c2e) repeating the process until the entire buffer memory in digitized format has been scanned and replaced with alphanumeric numerical representations.

18. A simple transmit-only facsimile transmission device comprising:
(a) a planar case including a scanning area for containing materials to be digitized;
(b) a read bar mounted for manual movement across said scanning area and parallel thereto, said read bar including a linear read head for developing a first electrical signal at an output thereof reflecting a one dimensional line of viewing of said read head as said head is moved over said scanning area;
(c) means for developing a second electrical signal indicating movement of said read bar across said scanning area a pre-defined distance defining the distance between one scanned line of said scanning area and a next said scanned line;
(d) governor means operably connected to said read bar for limiting the speed of movement of said read bar over said scanning area;
(e) a buffer memory for receiving the entire digitized contents of said viewing area as said viewing area is scanned by said read bar; and,
(f) logic means for establishing a connection to a receiving facsimile machine over a telephone line, for determining the group type of said receiving machine, and for transmitting the digitized contents of said buffer memory to said receiving machine in the proper format for its said group type.

19. The simple transmit-only facsimile transmission device of claim 18 and additionally comprising:
modem means disposed within said case and operably connected for connecting said logic means to said telephone line.

20. The simple transmit-only facsimile transmission device of claim 19 and additionally comprising:
touch-tone dialing means operably connected to said modem means for inputting a tone-based telephone number to said telephone line.

21. The simple transmit-only facsimile transmission device of claim 18 and additionally comprising:
(a) first switch means operably connected for sensing by said logic means; and wherein said logic means includes,
(b) logic for replacing the contents of said buffer memory with the entire digitized contents of said viewing area as said viewing area is scanned by said read bar only after said first switch means has been activated and sensed.

22. The simple transmit-only facsimile transmission device of claim 18 and additionally comprising:
(a) second switch means operably connected for sensing by said logic means; and wherein said logic means includes,
(b) logic for for determining the group type of said receiving machine, and for transmitting the digitized contents of said buffer memory to said receiving machine in the proper format for its said group type only after said second switch means has been activated and sensed.

23. The simple transmit-only facsimile transmission device of claim 18 and additionally comprising:
third switch means having said telephone line connected to an input thereof, said logic means connected to a first output thereof and a telephone connected to a second output thereof for selectively connecting said logic means or said telephone to said telephone line.

24. The simple transmit-only facsimile transmission device of claim 18 and additionally comprising:
(a) Y-connector means having said telephone line connected to an input thereof, said logic means connected to a first output thereof and a telephone connected to a second output thereof for simultaneously connecting said logic means and said telephone to said telephone line; and wherein,
(b) said transmitting of the digitized contents of said bufrer memory to said receiving machine is by means of an inaudible carrier frequency whereby said transmitting can take place simultaneously with a conversation on said telephone over said telephone line.

25. The simple transmit-only facsimile transmission device of claim 18 and additionally comprising:
(a) first light means for lighting in the presence of a dial tone on said telephone line; wherein,
(b) said logic means including means for sensing a dial tone on said telephone line and for activating said first light means when a dial tone is sensed;
(c) second light means for lighting in the presence of a carrier signal on said telephone line; wherein,
(d) said logic means including means for sensing a carrier signal on said telephone line and for activating said second light means when a carrier signal is sensed;

(e) third light means for lighting in the presence of a ready to receive signal on said telephone line; wherein, (f) said logic means including means for sensing a ready to receive signal on said telephone line and for activating said third light means when a ready to receive signal is sensed;

(g) fourth light means for lighting in the presence of an end of transmission signal on said telephone line; wherein, (h) said logic means including means for sensing an end of transmission signal on said telephone line and for activating said fourth light means when an end of transmission signal is sensed;

(i) fifth light means for lighting in the presence of an error at end of transmission signal on said telephone line; and wherein, (j) said logic means including means for sensing an error at end of transmission signal on said telephone line and for activating said fifth light means when an error at end of transmission signal is sensed.

26. A facsimile transmission system capable of transmitting and receiving simultaneously with a verbal conversation on a telephone line comprising:

(a) a 2-dimensional digitizing device comprising, a case, a read bar carried by said case and including a linear read head for developing a first electrical signal at an output thereof reflecting a one dimensional line of viewing of said read head, means for creating relative movement between sheets of material to be digitized and said read bar, and means for developing a second electrical signal indicating movement of said sheets of material relative to said read bar a pre-defined distance defining the distance between one scanned line of a scanning area and a next said scanned line; and, (b) modem means disposed within said case for connecting to a telephone line;

(c) buffer memory means for receiving the entire digitized contents of a 2-dimensional viewing area created by said relative movement between sheets of material to be digitized and said read bar, said digitized contents of said viewing area comprising a plurality of adjacent lines comprising said first electrical signal over a period of time wherein a new said line is started upon the occurrence of a said second electrical signal;

(d) logic means disposed in said case and connected to said buffer memory means, said modem means and to receive said first and second signals for establishing a connection to a receiving facsimile machine over a telephone line through said modem means, for determining the group type of said receiving machine, and for transmitting the digitized contents of said buffer memory to said receiving machine in the proper format for its said group type;

(e) Y-connector means having said telephone line connected to an input thereof, said logic means connected to a first output thereof and a telephone connected to a second output thereof for simultaneously connecting said logic means and said telephone to said telephone line; and wherein, (f) said transmitting of the digitized contents of said buffer memory to said receiving machine is by means of an inaudible carrier frequency whereby said telephone and a touch-tone dialing pad thereof can be employed to establish initial contact with said receiving machine and said transmitting can take place simultaneously with a conversation on said telephone over said telephone line.

27. A simple transmit-only facsimile transmission system comprising:

(a) a simple 2-dimensional digitizing device comprising,
 (a1) a case;
 (a2) a read bar carried by said case and including a linear read head for developing a first electrical signal at an output thereof reflecting a one dimensional line of viewing of said read head;
 (a3) means for creating relative movement between sheets of material to be digitized and said read bar; and,
 (a4) means for developing a second electrical signal indicating movement of said sheets of material relative to said read bar a pre-defined distance defining the distance between one scanned line of a scanning area and a next said scanned line; and, (b) digital computer means for executing programs stored therein and including a numeric input keyboard, said computer means having a data input operably connected to receive said first and second electrical signals;

(c) modem means disposed within said computer for connecting to a telephone line;

(d) buffer memory means for receiving the entire digitized contents of a 2-dimensional viewing area created by said relative movement between sheets of material to be digitized and said read bar, said digitized contents of said viewing area comprising a plurality of adjacent lines comprising said first electrical signal over a period of time wherein a new said line is started upon the occurrence of a said second electrical signal; and, (e) first program means operably disposed for execution by said computer means for inputting telephone numbers of receiving facsimile machines through said keyboard, for establishing a connection to a receiving facsimile machine over a telephone line through said modem means, for determining the group type of said receiving machine, and for transmitting the digitized contents of said buffer memory to said receiving machine in the proper format for its said group type.

28. The simple transmit-only facsimile transmission system of claim 27 wherein:

(a) said case is a planar case including a compartment defining said scanning area for containing materials to be digitized;

(b) said means for creating relative movement between sheets of material to be digitized and said read bar comprises said read bar being mounted for manual movement across said scanning area and parallel thereto, said read bar including said linear read head for developing said first electrical signal at an output thereof reflecting a one dimensional line of viewing of said read head as said head is moved over said scanning area, said read bar further including governor means operably connected for limiting the speed of movement of said read bar over said scanning area; and, (c) said means for developing a second electrical signal includes means for indicating movement of said read bar across said scanning area said pre-defined distance defining the distance between one scanned line of said scanning area and the next said scanned line.

29. The simple transmit-only facsimile transmission system of claim 27 wherein:
   (a) said case is a hollow case including a pair of opposed, contacting rollers for moving sheets of material to be digitized between an input slot and an output slot and includes means for rotating said rollers;
   (b) said read bar is mounted within said case between said input and output slots transversely across the path of movement of said moving sheets of material and parallel thereto, said read bar includes said linear read head for developing a first electrical signal at an output thereof reflecting a one dimensional line of viewing of said read head as said sheets are moved past said read head; and,
   (c) said means for developing a second electrical signal includes means for indicating movement of said sheets of material past said read bar said pre-defined distance defining the distance between one scanned line and the next said scanned line.

30. The simple transmit-only facsimile transmission system of claim 29 wherein:
   (a) said means for rotating said rollers includes a gear drive; and,
   (b) said means for developing a second electrical signal comprises detector means for detecting the teeth of a gear in said gear drive.

31. The simple transmit-only facsimile transmission system of claim 27 and additionally comprising:
   second program means operably disposed in said computer means for execution for transmitting the contents of said buffer memory to other programs disposed in said computer means for execution.

32. The simple transmit-only facsimile transmission system of claim 27 and additionally comprising:
   (a) dot printer means connected to be driven by said computer means for printing a 2-dimensional medium with a plurality of lines of adjacent dots in response to signals at an input thereof; and,
   (b) third program means operably disposed in said computer means for execution for transmitting the contents of said buffer memory to said printer means as a signal at said input to be printed thereby whereby said system can be used as a photocopier to copy documents from said simple 2-dimensional digitizing device to said printer means.

33. A simple computer-based facsimile system comprising:
   (a) a digitizing reader having a read bar including a linear read head for developing a first electrical signal at an output thereof reflecting a one dimensional line of viewing of said read head, means for creating relative movement between sheets of material to be digitized and said read bar, and means for developing a second electrical signal indicating movement of said sheets of material relative to said read bar a pre-defined distance defining the distance between one scanned line of a scanning area and a next said scanned line;
   (b) digital computer means for executing programs stored therein and including a numeric input keyboard, said computer means having a data input operably connected to receive said first and second electrical signals;
   (c) modem means disposed within said computer for connecting to a telephone line;
   (d) buffer memory means disposed in said computer means for receiving the entire digitized contents of a 2-dimensional viewing area created by said relative movement between sheets of material to be digitized and said read bar, said digitized contents of said viewing area comprising a plurality of adjacent lines comprising said first electrical signal over a period of time wherein a new said line is started upon the occurrence of a said second electrical signal;
   (e) first program means operably disposed for execution by said computer means for inputting telephone numbers of receiving facsimile machines through said keyboard, for establishing a connection to a receiving facsimile machine over a telephone line through said modem means, for determining the group type of said receiving machine, and for transmitting the digitized contents of said buffer memory to said receiving machine in the proper format for its said group type;
   (f) dot printer means connected to be driven by said computer means for printing a 2-dimensional medium with a plurality of lines of adjacent dots in response to signals at an input thereof; and,
   (g) second program means operably disposed in said computer means for execution for receiving facsimile input data from said modem means, for storing said received data in said buffer memory until a full "page" of data has been received, and for transmitting the contents of said buffer memory to said printer means as a signal at said input to be printed thereby.

34. The simple computer-based facsimile system of claim 33 and additionally comprising:
   (a) Y-connector means having said telephone line connected to an input thereof, said modem means connected to a first output thereof and a telephone connected to a second output thereof for simultaneously connecting said modem means and said telephone to said telephone line; and wherein,
   (b) said transmitting of the digitized contents of said buffer memory to said receiving machine is by means of an inaudible carrier frequency whereby said transmitting can take place simultaneously with a conversation on said telephone over said telephone line.

35. A dual-mode page reading device for outputting in a digitizing mode or outputting in a text mode for use by alphanumeric-oriented functions comprising:
   (a) digitizing reader means having a read bar including a linear read head for developing a first electrical signal at an output thereof reflecting a one dimensional line of viewing of said read head, said digitizing reader means including means for creating relative movement between sheets of material to be digitized and said read bar and means for developing a second electrical signal indicating movement of said sheets of material relative to said read bar a predefined distance defining the distance between one scanned line of a scanning area and a next said scanned line;
   (b) buffer memory means for receiving the entire digitized contents of a 2-dimensional viewing area created by said relative movement between sheets of material to be digitized and said read bar, said digitized contents of said viewing area comprising a plurality of adjacent lines comprising said first electrical signal over a period of time wherein a new said line is started upon the occurrence of a said second electrical signal, the contents of said buffer memory means being output as the output of said digitizing device;

(c) switch means for selecting between a digitized mode for the digitizing device and a text mode for the digitizing device; and, (d) conversion logic means connected to sense said switch means for, (d1) when said switch means is in a "DIGITIZED" position, filling said buffer memory means with digitized pixel/line format information relative to the scanned contents of said viewing area; and, (d2) when said switch means is in a "TEXT" position, operating as an optical character reader by, (d2a) first inputting the digitized data to said buffer memory means in digitized pixel/line format;

(d2b) when the entire contents of said viewing area has been digitized into said buffer memory, scanning from the "top" to the "bottom" of the "page" represented thereby;

(d2c) when a "line" of characters has been isolated and identified, scanning the line from "left" to "right" looking for "character" bit configurations by matching against a list of previously defined alphanumeric character representations on a "best guess" basis;

(d2d) as each character of the line is identified, inserting a numerical representation thereof into a next character position in said buffer memory; and, (d2e) repeating the process until the entire said buffer memory in digitized format has been scanned and replaced with alphanumeric numerical representations.

36. A portable office comprising:

(a) an attache-type case having a handle for carrying and an openable lid;

(b) a digitizing reader disposed within said case, said reader having a read bar including a linear read head for developing a first electrical signal at an output thereof reflecting a one dimensional line of viewing of said read head, means for creating relative movement between sheets of material to be digitized and said read bar, and means for developing a second electrical signal indicating movement of said sheets of material relative to said read bar a predefined distance defining the distance between one scanned line of a scanning area and a next said scanned line;

(c) a numeric input keyboard disposed within said case;

(d) modem means disposed within said case for connecting to a telephone line;

(e) buffer memory means disposed within said case for receiving the entire digitized contents of a 2-dimensional viewing area created by said relative movement between sheets of material to be digitized and said read bar, said digitized contents of said viewing area comprising a plurality of adjacent lines comprising said first electrical signal over a period of time wherein a new said line is started upon the occurrence of a said second electrical signal;

(f) dot printer means disposed within said case for printing a 2-dimensional medium with a plurality of lines of adjacent dots in response to signals at an input thereof;

(g) telephone handset means and operably connectable for conducting voice conversations over said telephone line; and, (h) logic means disposed within said case and operably connected to receive said first and second electrical signals and to said keyboard, said buffer memory means, and said printer means, said logic means including, (h1) first sublogic means for inputting data from said digitizing reader to said buffer memory means;

(h2) second sublogic means for inputting telephone numbers of receiving facsimile machines through said keyboard, for establishing a connection to a receiving facsimile machine over a telephone line through said modem means, for determining the group type of said receiving machine, and for transmitting the digitized contents of said buffer memory to said receiving machine in the proper format for its said group type; and, (h3) third sublogic means for transmitting the contents of said buffer memory to said printer means as a signal at said input to be printed thereby whereby the portable office can be used as a photocopier to copy documents from said digitizing reader to said printer means.

37. The portable office of claim 36 and additionally comprising:
said logic means including fourth sublogic means for receiving facsimile input data from said modem means, for storing said received data in said buffer memory until a full "page" of data has been received, and for transmitting the contents of said buffer memory to said printer means as a signal at said input to be printed thereby.

38. The portable office of claim 36 and additionally comprising:

(a) Y-connector means having said telephone line connected to an input thereof, said modem means connected to a first output thereof and said telephone handset means connected to a second output thereof for simultaneously connecting said modem means and said telephone handset means to said telephone line; and wherein, (b) said transmitting of the digitized contents of said bufrer memory means to said receiving machine is by means of an inaudible carrier frequency whereby said transmitting can take place simultaneously with a conversation on said telephone handset means over said telephone line.

39. The portable office of claim 36 and additionally comprising:

(a) panel display means disposed within said lid of said case for displaying a 2-dimensional display comprising a plurality of lines of adjacent dots in response to signals at an input thereof; and, (b) said logic means including fifth sublogic means for receiving facsimile input data from said modem means, for storing said received data in said buffer memory until a full "page" of data has been received, and for transmitting the contents of said buffer memory to said panel display means as a signal at said input to be displayed thereby.

40. The portable office of claim 39 wherein:
said panel display means is removably held in said lid and includes powered memory means for holding a bit map of the present display thereon whereby said panel display means can be removed and placed in a photocopy machine to make a copy thereof.

* * * * *